US012621340B2

(12) United States Patent
Yarabolu

(10) Patent No.: US 12,621,340 B2
(45) Date of Patent: May 5, 2026

(54) DETECTING AND PREVENTING MALWARE ATTACKS USING SIMULATED ANALYTICS AND CONTINUOUS AUTHENTICATION

(71) Applicant: Bank of America Corporation, Charlotte, NC (US)

(72) Inventor: Vijay Kumar Yarabolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 291 days.

(21) Appl. No.: 17/861,626

(22) Filed: Jul. 11, 2022

(65) Prior Publication Data

US 2024/0015178 A1      Jan. 11, 2024

(51) Int. Cl.
H04L 9/40            (2022.01)

(52) U.S. Cl.
CPC ............ H04L 63/145 (2013.01); H04L 63/08 (2013.01)

(58) Field of Classification Search
None
See application file for complete search history.

(56) References Cited

U.S. PATENT DOCUMENTS

| | | |
|---|---|---|
| 2005/0193430 A1 | 9/2005 | Cohen et al. |
| 2007/0016953 A1 | 1/2007 | Morris et al. |
| 2011/0047620 A1 | 2/2011 | Mahaffey et al. |
| 2013/0055404 A1 | 2/2013 | Khalili |

| | | |
|---|---|---|
| 2013/0173782 A1 | 7/2013 | Ragutski et al. |
| 2013/0333037 A1 | 12/2013 | Bowen et al. |
| 2013/0347116 A1 | 12/2013 | Flores et al. |

(Continued)

FOREIGN PATENT DOCUMENTS

| | | | | |
|---|---|---|---|---|
| WO | WO-9916207 A1 * | 4/1999 | .......... | G06F 11/0709 |

OTHER PUBLICATIONS

"5 Reasons why Digital Twins Could be the Future of Retrofitting", ASITE, Oct. 20, 2021, downloaded from <https://asite.com/blogs/5-reasons-why-digital-twins-could-be-the-future-of-retrofitting> on Jul. 11, 2022.

(Continued)

*Primary Examiner* — Bassam A Noaman
(74) *Attorney, Agent, or Firm* — Banner & Witcoff, Ltd.

(57) ABSTRACT

Aspects of the disclosure relate to detecting and preventing malware attacks using simulated analytics and continuous authentication. An application server may receive device information and processing capabilities information of a client device. Based on the device information and the processing capabilities information, the application server may generate analytical output data indicating, for each transaction executed on the client device, a transaction processing time. The application server may receive transaction information associated with a transaction being executed at the client device. Based on the received transaction information and the analytical output data, the application server may simulate the transaction being executed at the client device and determine expected payload data. The application server may receive an authorization request including actual payload data associated with the transaction being executed at the client device. The application server may compare the expected payload data with the actual payload data and send an authorization response.

14 Claims, 11 Drawing Sheets

(56)  References Cited

U.S. PATENT DOCUMENTS

| | | | |
|---|---|---|---|
| 2014/0189873 A1 | 7/2014 | Elder et al. | |
| 2014/0351907 A1* | 11/2014 | Noble | H04L 63/08 726/6 |
| 2016/0065601 A1 | 3/2016 | Gong et al. | |
| 2016/0103838 A1 | 4/2016 | Sainani et al. | |
| 2017/0012843 A1* | 1/2017 | Zaidi, III | H04L 43/0858 |
| 2017/0063901 A1 | 3/2017 | Muddu et al. | |
| 2017/0063907 A1 | 3/2017 | Muddu et al. | |
| 2017/0078922 A1* | 3/2017 | Raleigh | H04L 69/18 |
| 2017/0126731 A1 | 5/2017 | Vallone et al. | |
| 2018/0343278 A1 | 11/2018 | Vallone et al. | |
| 2019/0068616 A1 | 2/2019 | Woods et al. | |
| 2020/0067966 A1 | 2/2020 | Irimie et al. | |
| 2020/0128441 A1* | 4/2020 | Singh | H04W 72/23 |
| 2020/0342106 A1* | 10/2020 | Chelarescu | G06F 11/2097 |
| 2021/0173939 A1 | 6/2021 | Kotler et al. | |
| 2021/0266743 A1* | 8/2021 | Kvochko | H04L 63/102 |
| 2021/0344726 A1 | 11/2021 | Sharifi Mehr | |
| 2021/0382992 A1 | 12/2021 | Massiglia et al. | |
| 2022/0030009 A1 | 1/2022 | Hasan | |
| 2022/0109681 A1 | 4/2022 | Hamdi | |
| 2022/0201042 A1 | 6/2022 | Crabtree et al. | |
| 2022/0210200 A1 | 6/2022 | Crabtree et al. | |

OTHER PUBLICATIONS

"Digital Twin", Wikipedia, downloaded from <https://en.wikipedia.org/wiki/Digital_twin> on Jul. 11, 2022.

Javier Tordable, "Doubling Down on Insights With Digital Twins", Jun. 25, 2021, downloaded from <https://www.forbes.com/sites/googlecloud/2021/06/25/doubling-down-on-insights-with-digital-twins/> on Jul. 11, 2022.

* cited by examiner

110

111

112

113

Malware Detection Computing Platform

Processor(s)

Memory(s)

Malware Detection Module
112a

Simulation Module
112b

Communication Interface(s)

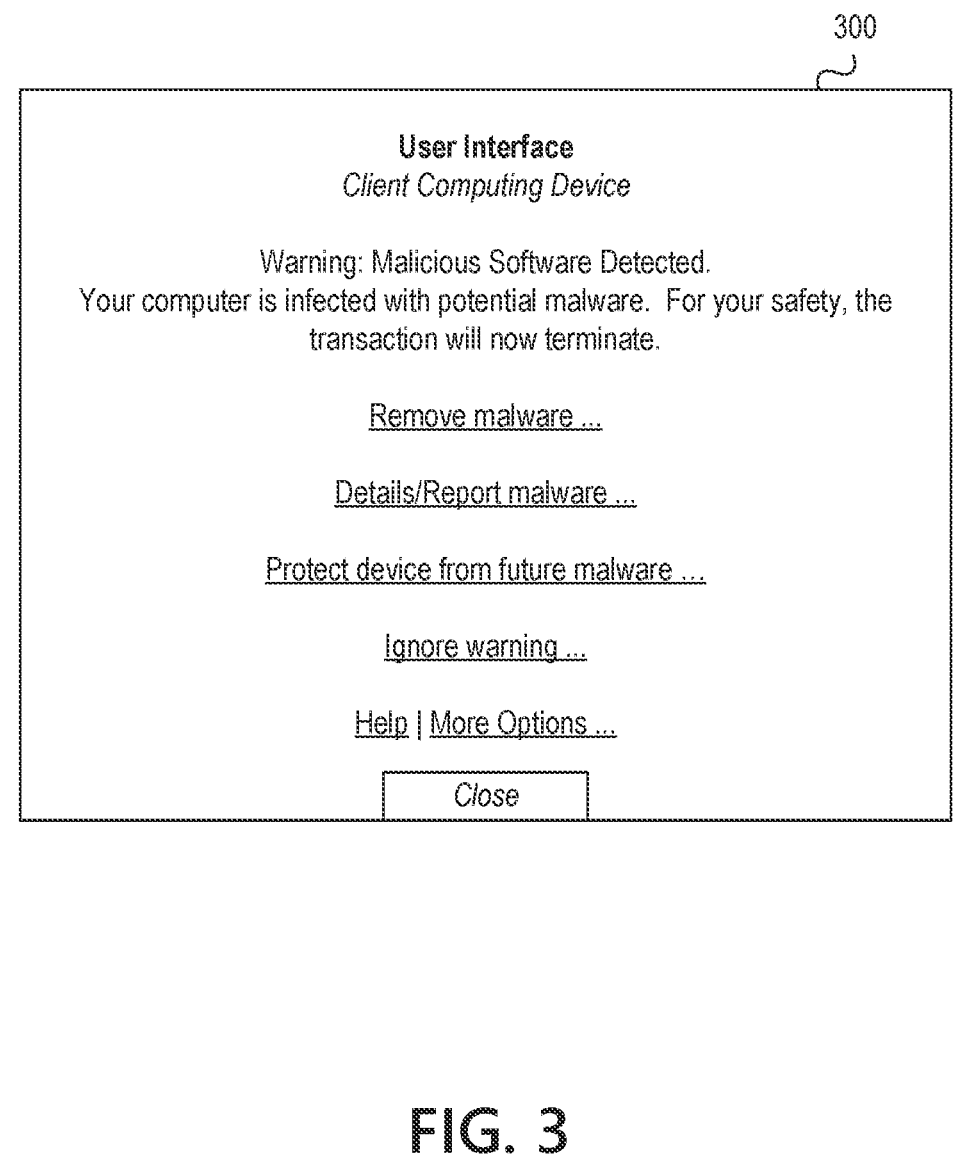

300

User Interface
*Client Computing Device*

Warning: Malicious Software Detected.
Your computer is infected with potential malware. For your safety, the
transaction will now terminate.

Remove malware ...

Details/Report malware ...

Protect device from future malware ...

Ignore warning ...

Help | More Options ...

Close

FIG. 3

DETECTING AND PREVENTING MALWARE ATTACKS USING SIMULATED ANALYTICS AND CONTINUOUS AUTHENTICATION

BACKGROUND

Aspects of the disclosure relate to computer system security. In particular, one or more aspects of the disclosure relate to detecting and preventing malware attacks using simulated analytics and continuous authentication.

Malicious software, i.e. □malware, □presents a serious hazard to computer systems and devices. Once present on a computing system or device, malware can, among other effects, appropriate personal, financial or otherwise sensitive information, and hinder or wholly prevent proper system performance. Despite efforts to block or remove malware from systems, such as the use of antivirus software programs, reports have shown an exponential increase in malware activities year after year. The widespread presence of malware is due in part to the extent and diversity of malware variants. New malware variants are constantly being created, typically in increasing sophistication and complexity. Oftentimes it may be difficult to detect and prevent malware from penetrating user applications.

SUMMARY

Aspects of the disclosure provide effective, efficient, scalable, and convenient technical solutions that address and overcome the technical problems associated with detecting and preventing malware attacks. For example, some aspects of the disclosure may leverage simulated analytics and digital twin technology to continuously detect and prevent malware activity and/or to perform other functions. In accordance with one or more embodiments, a system including a client device, an application server, and an application interface therebetween is provided. The application server may receive, via the application interface, device information of the client device. The application server may receive, via the application interface, processing capabilities information of the client device. Based on the device information and the processing capabilities information, the application server may generate analytical output data indicating, for each transaction executed on the client device, a transaction processing time. The application server may receive transaction information associated with a transaction being executed at the client device. Based on the received transaction information and the analytical output data, the application server may simulate the transaction being executed at the client device. The application server may determine expected payload data based on the simulation. The application server may receive an authorization request. In addition the authorization request may include actual payload data associated with the transaction being executed at the client device. The application server may compare the expected payload data with the actual payload data. Based on the comparison, the application server may send an authorization response.

In some examples, the processing capabilities of the client device may be determined by executing simulated processing of one or more types of transactions at the client device during an enrollment process.

In some embodiments, the analytical output data may include a graphical visualization representing results of a simulated process.

In some arrangements, simulating the transaction being executed at the client device may include simulating transaction steps of the transaction based on the device information and the processing capabilities information of the client device.

In some examples, receiving the device information of the client device may include receiving information related to one or more of: a device type, a vendor name, a model name or number, a firmware version, a product name, a device identifier, or a processor identifier.

In some example arrangements, sending the authorization response may include sending a message indicating whether the transaction is approved or denied.

In some examples, sending the authorization response may include sending a notification indicating presence of malware.

In some arrangements, receiving transaction information associated with the transaction being executed at the client device may include receiving information indicative of a transaction type.

In some embodiments, the application server may transmit the analytical output data for storage in one or more database tables.

In some examples, simulating the transaction being executed at the client device may include using a virtual representation of the client device.

In some embodiments, the transaction being executed at the client device may include a transaction initiated on the client device via a mobile application.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an example graphical user interface for detecting and preventing malware attacks using simulated analytics and continuous authentication in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to detecting and preventing malware attacks using simulated analytics and continuous authentication. Additional aspects of the disclosure may leverage digital twin technology to simulate client-side interactions at the server-side. For example, an application server may receive device information and processing capabilities information of a client device, and based on that information, generate analytical output data. The generated analytical output data may be then used to simulate a transaction being executed at the client device. Further aspects of the disclosure may compare simulated and actual payload data for transaction authorization and malware detection.

Figure 1A:
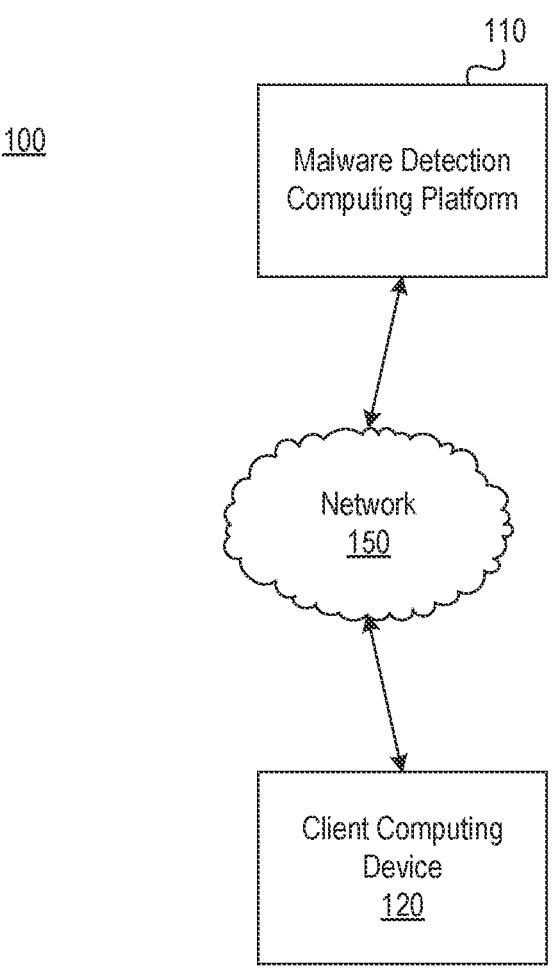
FIGS. 1A-1C depict an illustrative computing environment for detecting and preventing malware attacks using simulated analytics and continuous authentication in accordance with one or more example embodiments.
Figure 1B:
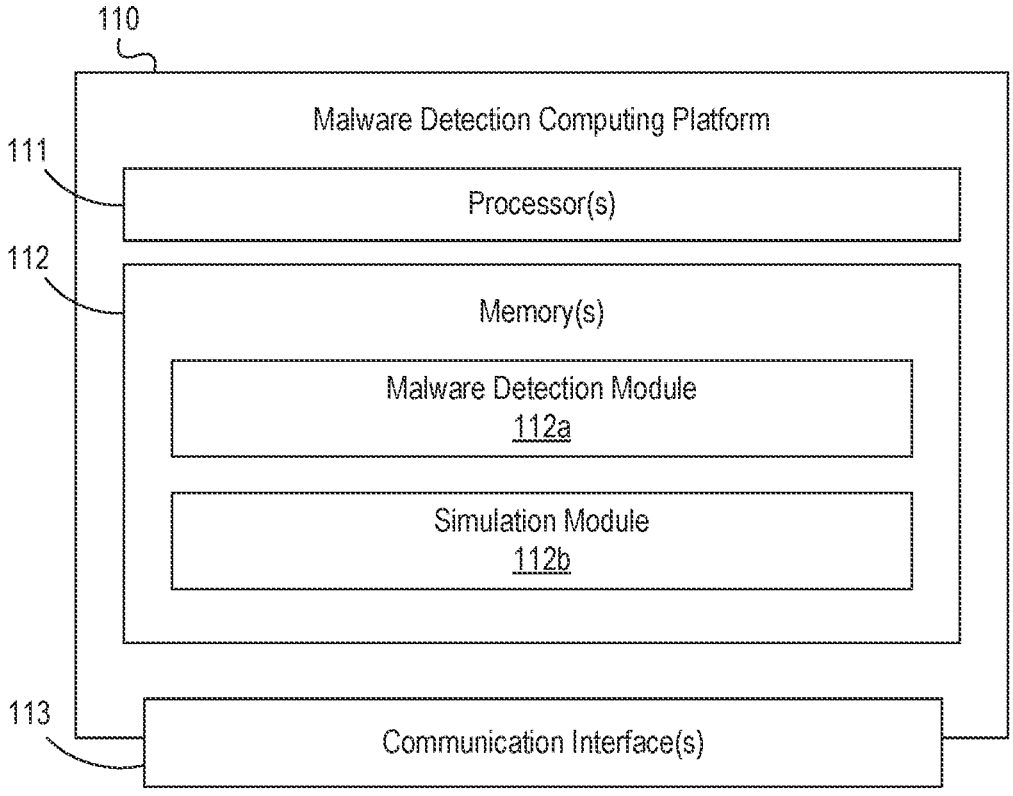
Figure 1C:
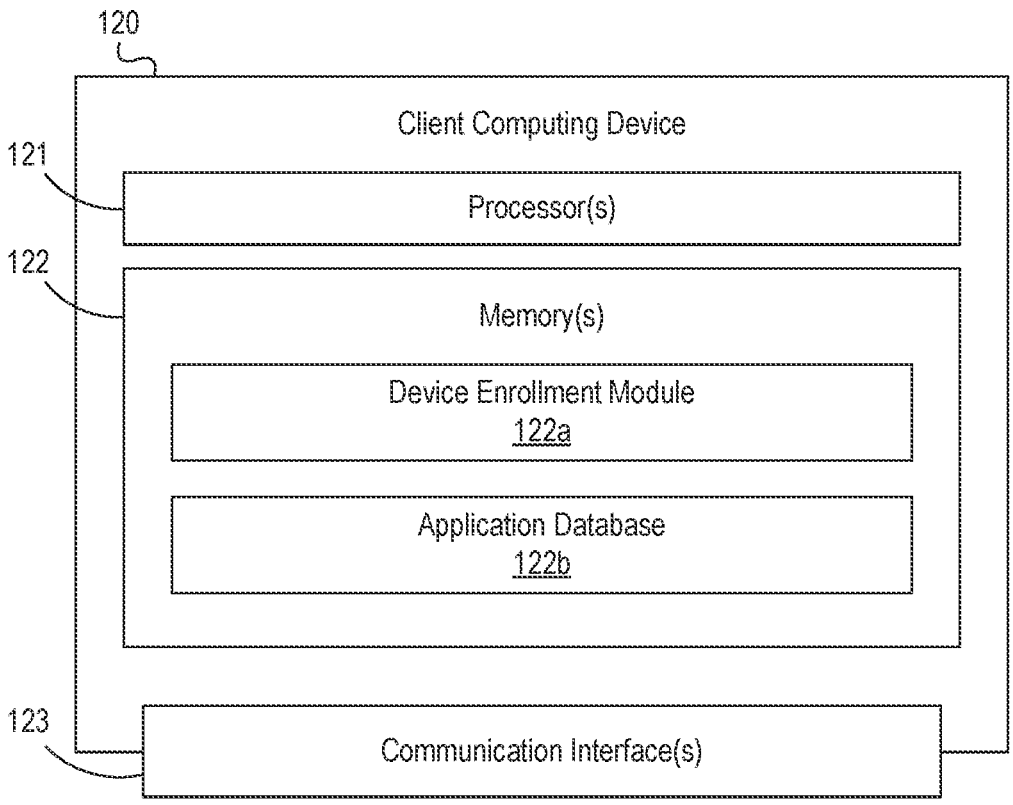

FIGS. 1A-1C depict an illustrative computing environment for detecting and preventing malware attacks using simulated analytics and continuous authentication in accordance with one or more example embodiments. Referring to FIG. 1A, computing environment 100 may include one or more devices (e.g., computer systems, communication devices, servers). For example, computing environment 100 may include malware detection computing platform 110 and client computing device 120. Although one client computing device 120 is shown for illustrative purposes, any number of client computing devices may be used without departing from the disclosure.

As illustrated in greater detail below, malware detection computing platform 110, also referred to as an application server, may include one or more computing devices configured to perform one or more of the functions described herein. For example, malware detection computing platform 110 may include one or more computers (e.g., laptop computers, desktop computers, servers, server blades, or the like) configured to perform simulations for malware detection using generated device profiles, digital twin technology, and/or one or more other functions described herein.

Client computing device 120 may include one or more computing devices and/or other computer components (e.g., processors, memories, communication interfaces). For instance, client computing device 120 may be, for example, a desktop, laptop, tablet or mobile computer with a software application, a mobile device or mobile phone with Internet capability, or any computing device from which a user can access application content, or the like, and may be associated with an enterprise organization operating malware detection computing platform 110. Client computing device 120 may be an endpoint computing device for client-server communications between the client computing device 120 and one or more servers (e.g., malware detection computing platform 110). The client computing device 120 may be communicatively coupled to one or more networks 150.

Computing environment 100 also may include one or more networks, which may interconnect one or more of malware detection computing platform 110 and client computing device 120. For example, computing environment 100 may include a network 150 (which may, e.g., interconnect malware detection computing platform 110, client computing device 120, and/or one or more other systems which may be associated with an enterprise organization, such as a financial institution, with one or more other systems, public networks, sub-networks, and/or the like).

In one or more arrangements, malware detection computing platform 110 and client computing device 120 may be any type of computing device capable of receiving a user interface, receiving input via the user interface, and communicating the received input to one or more other computing devices. For example, malware detection computing platform 110, client computing device 120, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, malware detection computing platform 110 may include one or more processor(s) 111, memory(s) 112, and communication interface(s) 113. A data bus may interconnect processor 111, memory 112, and communication interface 113. Communication interface 113 may be a network interface configured to support communication between malware detection computing platform 110 and one or more networks (e.g., network 150 or the like). Memory 112 may include one or more program modules having instructions that when executed by processor 111 cause malware detection computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of malware detection computing platform 110 and/or by different computing devices that may form and/or otherwise make up malware detection computing platform 110. For example, memory 112 may have, store, and/or include a malware detection module 112a and a simulation module 112b. Malware detection module 112a may have instructions that direct and/or cause malware detection computing platform 110 to, for instance, generate analytical output data based on device capabilities including processing speed, or similar device information, to carry out malware detection and/or instructions that direct malware detection computing platform 110 to perform other functions, as discussed in greater detail below. Simulation module 112b may perform a simulated process and generate simulated information. For instance, simulation module 112b may replicate processes of a client computing device (e.g., client computing device 120) in order to collect data to predict how a process will perform.

Referring to FIG. 1C, client computing device 120 may include one or more processors 121, memory 122, and communication interface 123. A data bus may interconnect processor 121, memory 122, and communication interface 123. Communication interface 123 may be a network interface configured to support communication between user device 120 and one or more networks (e.g., network 150, or the like). Memory 122 may include one or more program modules having instructions that when executed by processor 121 cause user device 120 to perform one or more functions described herein and/or one or more databases that may store and/or otherwise maintain information which may be used by such program modules and/or processor 121. In some instances, the one or more program modules and/or databases may be stored by and/or maintained in different memory units of user device 120 and/or by different computing devices that may form and/or otherwise make up user device 120. For example, memory 122 may have, host, store, and/or include device enrollment module 122a and application database 122b. Device enrollment module 122a may have instructions that direct and/or cause client computing device 120 to generate analytical output data associated with a device (e.g., device capabilities information, payload information, etc.), or other device profile information. Application database 122b may store information in performing malware detection and/or in performing other functions, as discussed in greater detail below. For instance, application database 122b may store the analytical output data (e.g., device capabilities information, payload information, etc.) generated by malware detection computing platform 110.

Figure 2A:
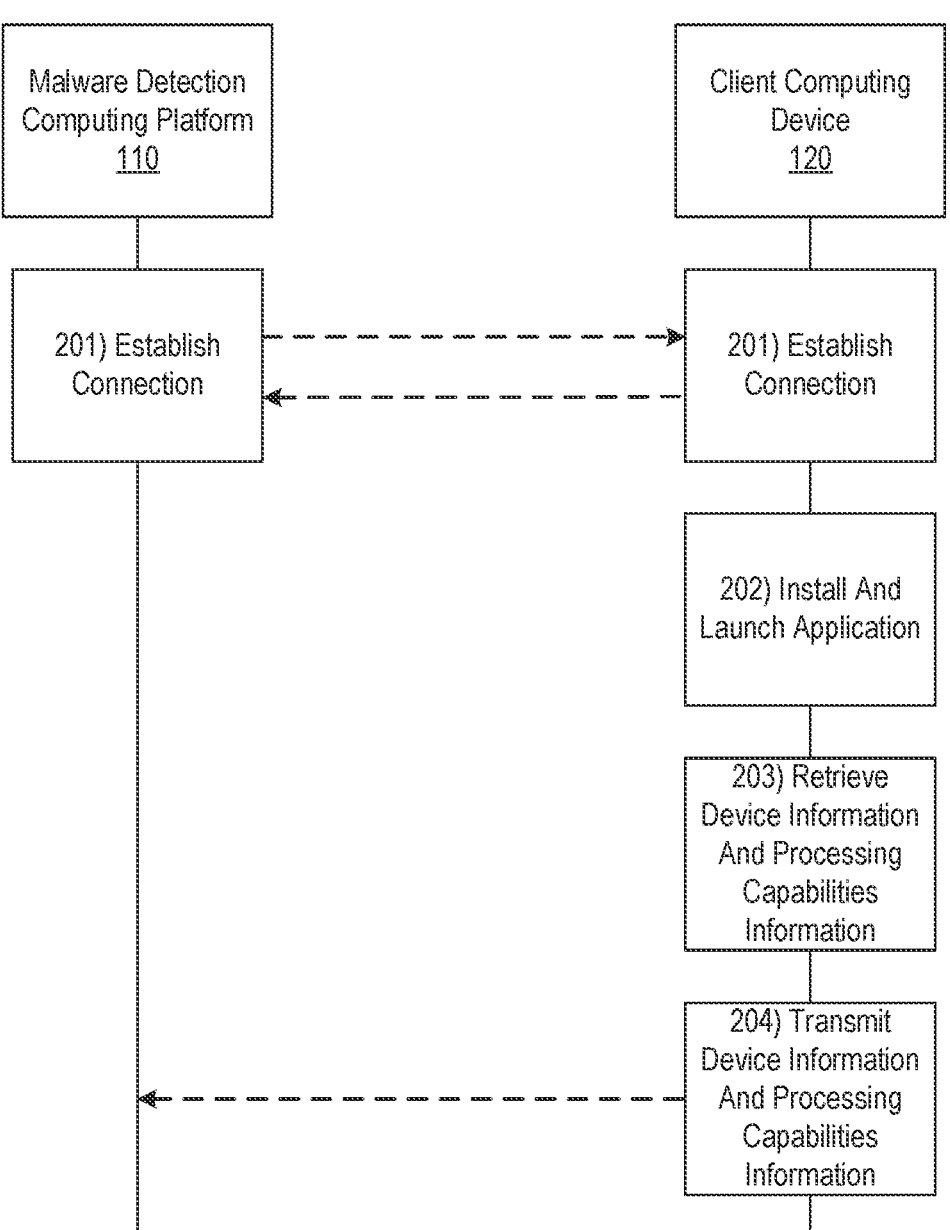
FIGS. 2A-2F depict an illustrative event sequence for detecting and preventing malware attacks using simulated analytics and continuous authentication in accordance with one or more example embodiments.

FIGS. 2A-2F depict an illustrative event sequence for detecting and preventing malware attacks using simulated analytics and continuous authentication in accordance with one or more example embodiments. Referring to FIG. 2A, at step 201, an application server (e.g., malware detection computing platform 110) may establish a connection with a client device (e.g., client computing device 120). For example, malware detection computing platform 110 may establish a first wireless data connection with client computing device 120 to link malware detection computing platform 110 with client computing device 120. In some instances, malware detection computing platform 110 may identify whether or not a connection is already established with client computing device 120. If a connection is already established with client computing device 120, malware detection computing platform 110 might not re-establish the connection. If a connection is not yet established with the client computing device 120, malware detection computing platform 110 may establish the first wireless data connection as described above.

An enrollment process may begin at step 202. At step 202, the client device (e.g., client computing device 120) may install and launch an application (e.g., a mobile client application). For example, the client device (e.g., client computing device 120) may receive a user input to launch an application adapted to be run on the client device (e.g., client computing device 120). The application may comprise an application programming interface (API).

At step 203, upon launching of the application on client device (e.g., client computing device 120), the application may gather or retrieve device information. For example, the application may gather or retrieve device information related to a device type, a vendor or manufacturer name, a model name or number, a firmware version, a product name, a device identifier, a processor identifier, and/or the like. In addition, the application may gather or retrieve processing capabilities information. For example, the application may gather or retrieve processing capabilities information concerning the client device (e.g., client computing device 120) by executing simulated processing of one or more types of transactions at the client device during an enrollment process. For instance, the simulated processing at the client device (e.g., client computing device 120) may be used to assess the time a given process takes to execute at the client-side (e.g., assess how capable the device is).

At step 204, the client device (e.g., client computing device 120) may transmit, via the application programming interface (API), the device information and the processing capabilities information to the application server (e.g., malware detection computing platform 110).

Figure 2B:
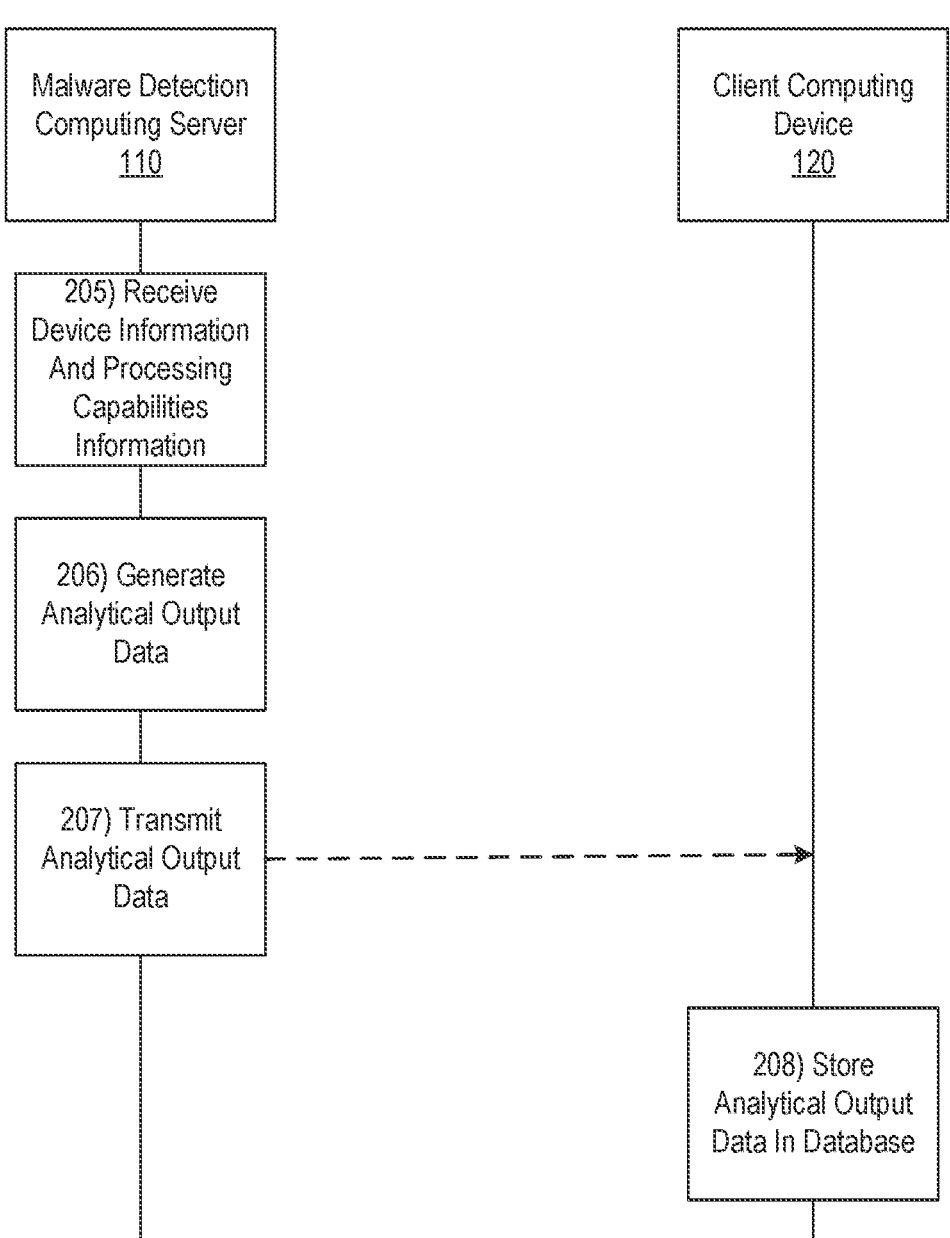

Referring to FIG. 2B, at step 205, the application server (e.g., malware detection computing platform 110) may receive, from the client device (e.g., client computing device 120), the device information and the processing capabilities information. At step 206, based on the device information and the processing capabilities information, the application server (e.g., malware detection computing platform 110) may generate analytical output data indicating, for a given transaction executed on the client device (e.g., client computing device 120), a transaction processing time (e.g., a data processing time or data processing speed). In some examples, the analytical output data may include a graphical visualization (e.g., a data visualization line plot, a wave plot, a pattern, a graph, or the like) representing results of a simulated process.

At step 207, the application server (e.g., malware detection computing platform 110) may transmit the analytical output data to the client device (e.g., client computing device 120). At step 208, the client device (e.g., client computing device 120) may store the analytical output data for later use. For example, the client device (e.g., client computing device 120) may store the analytical output in a database (e.g., in application database 122b). In some examples, the client device (e.g., client computing device 120) may store the analytical output in or one or more database tables (e.g., in a relational database including multiple tables of data that relate to each other through one or more fields). The tables of data may include device capabilities information (e.g., processing capabilities of a device), payload information (e.g., the data to be transmitted), and/or the like. The payload information may include, for each process or transaction, how much time it will take to execute that transaction, the data size of the transaction, and/or the like. In some instances, the payload may include the portion of malware which performs malicious action.

Figure 2C:
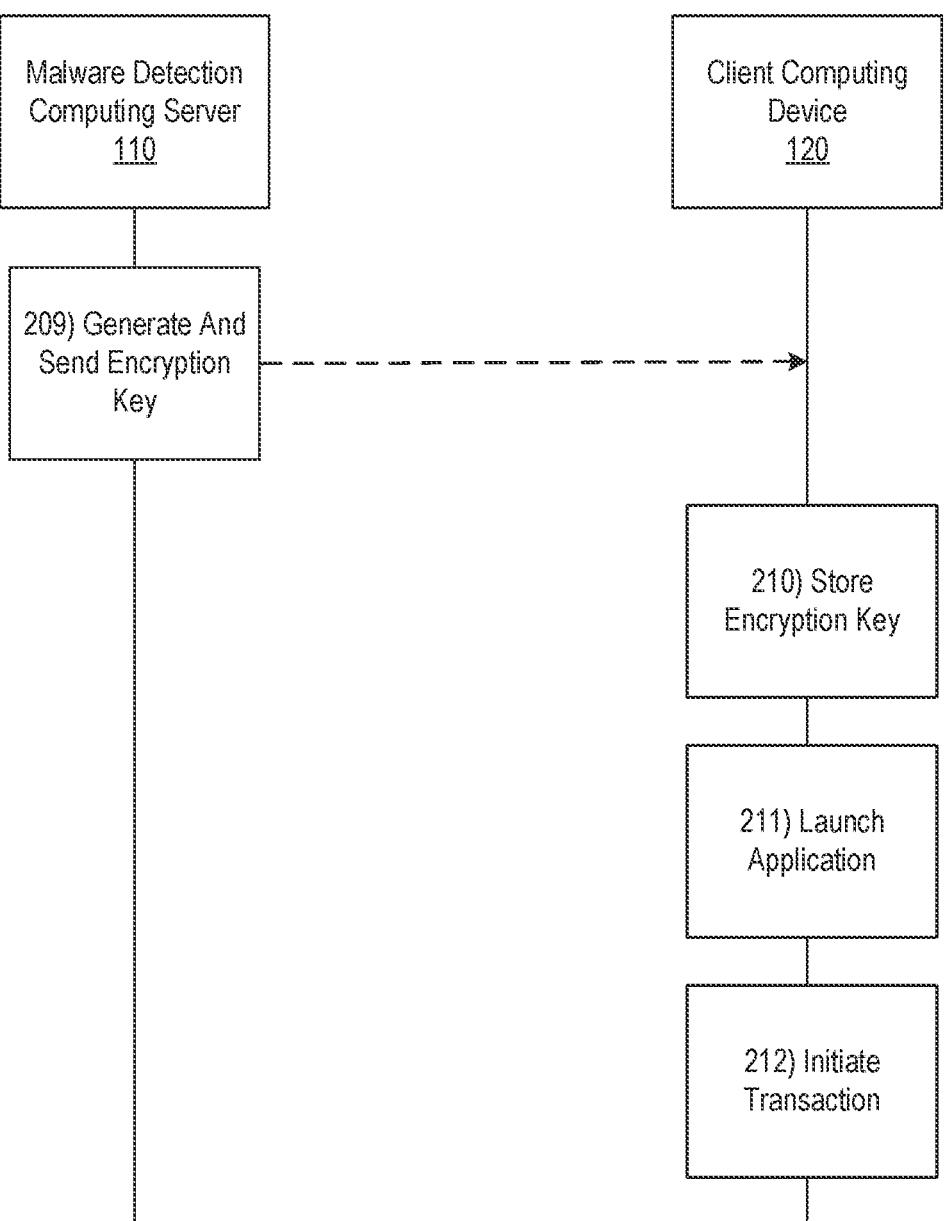

In some embodiments, referring to FIG. 2C, at step 209, the application server (e.g., malware detection computing platform 110) may generate and send an encryption key to the client device (e.g., client computing device 120). At step 210, the client device (e.g., client computing device 120) may receive and store the encryption key for future encryptions. In some examples, the client device (e.g., client computing device 120) may use the encryption key to digitally sign a transaction.

Accordingly, the enrollment process (e.g., steps 201 through 210) may create a baseline behavior model (e.g., understanding what the device capabilities are, what the expectations are for the payload, etc.), which may be used to run a simulation upon launch of an application to identify whether a device or transaction is infected with malware.

For example, after enrollment, at step 211, a user of the client device (e.g., client computing device 120) may launch the application (e.g., the mobile client application) again. In turn, at step 212, a transaction may be initiated at the client device (e.g., client computing device 120). For example, the transaction may be initiated on the client device (e.g., client computing device 120) via a mobile application. In some examples, the transaction may include withdrawing cash, making payments to creditors, sending remittances, transferring balances from one account to another account, loading money onto stored valued cards and/or prepaid cards, donating to charities, and/or the like.

Figure 2D:
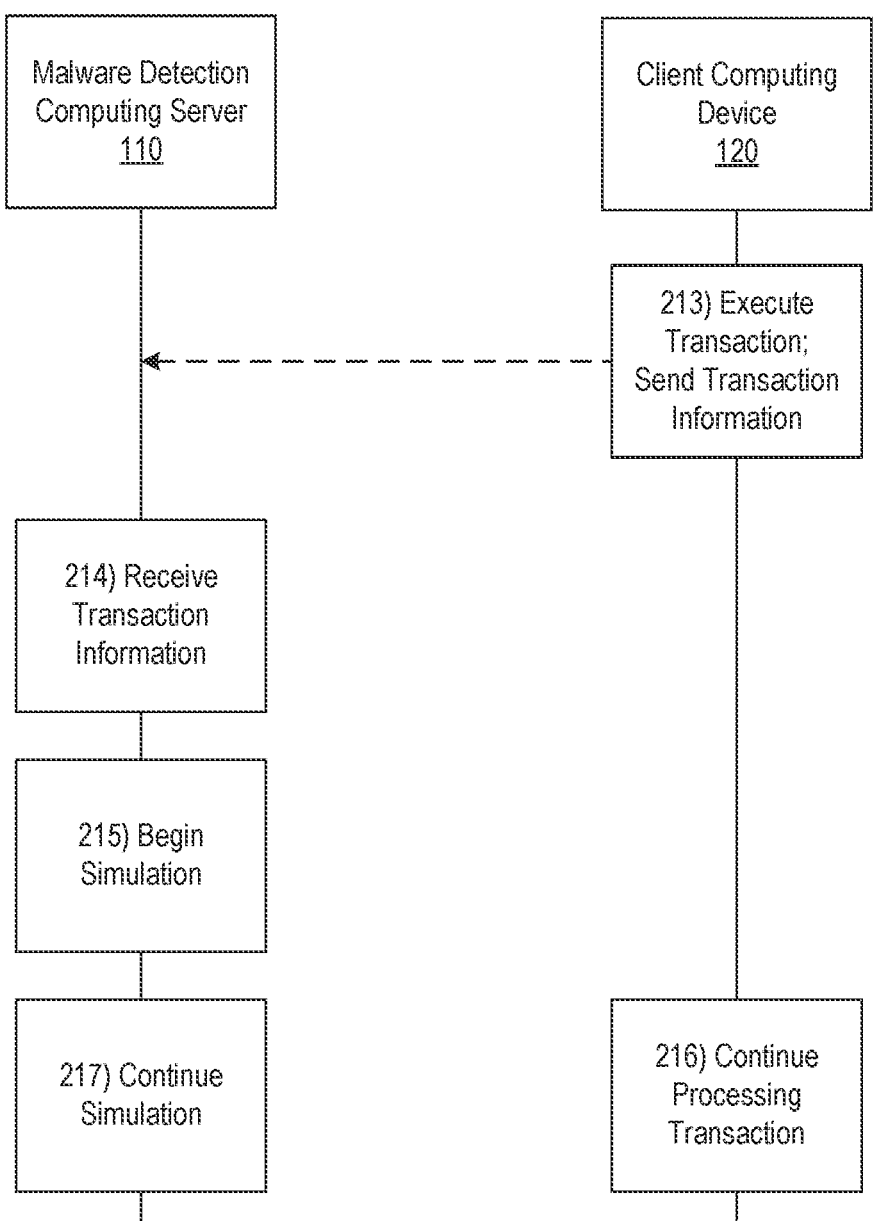

Referring to FIG. 2D, at step 213, the client device (e.g., client computing device 120) may begin executing transaction steps associated with the transaction. In addition, the client device (e.g., client computing device 120) may send transaction information associated with the transaction to the application server (e.g., malware detection computing platform 110). For example, the client device (e.g., client computing device 120) may send, to the application server (e.g., malware detection computing platform 110), information indicative of a transaction type.

At step 214, the application server (e.g., malware detection computing platform 110) may receive the transaction information associated with a transaction being executed at the client device. Based on the received transaction information, the application server (e.g., malware detection computing platform 110) may, at step 215, begin simulating transaction steps of the transaction being executed at the client device (e.g., client computing device 120). In some examples, the simulation is executed using a virtual representation of the client device (e.g., client computing device 120). In some examples, the simulation is based on the analytical output data generated by the application server (e.g., malware detection computing platform 110) during the enrollment process (e.g., at step 206).

At step 216, the client device (e.g., client computing device 120) may continue processing the transaction at the client-side. Meanwhile, at step 217, the application server (e.g., malware detection computing platform 110) may continue the simulation at the server-side in real-time.

Figure 2E:
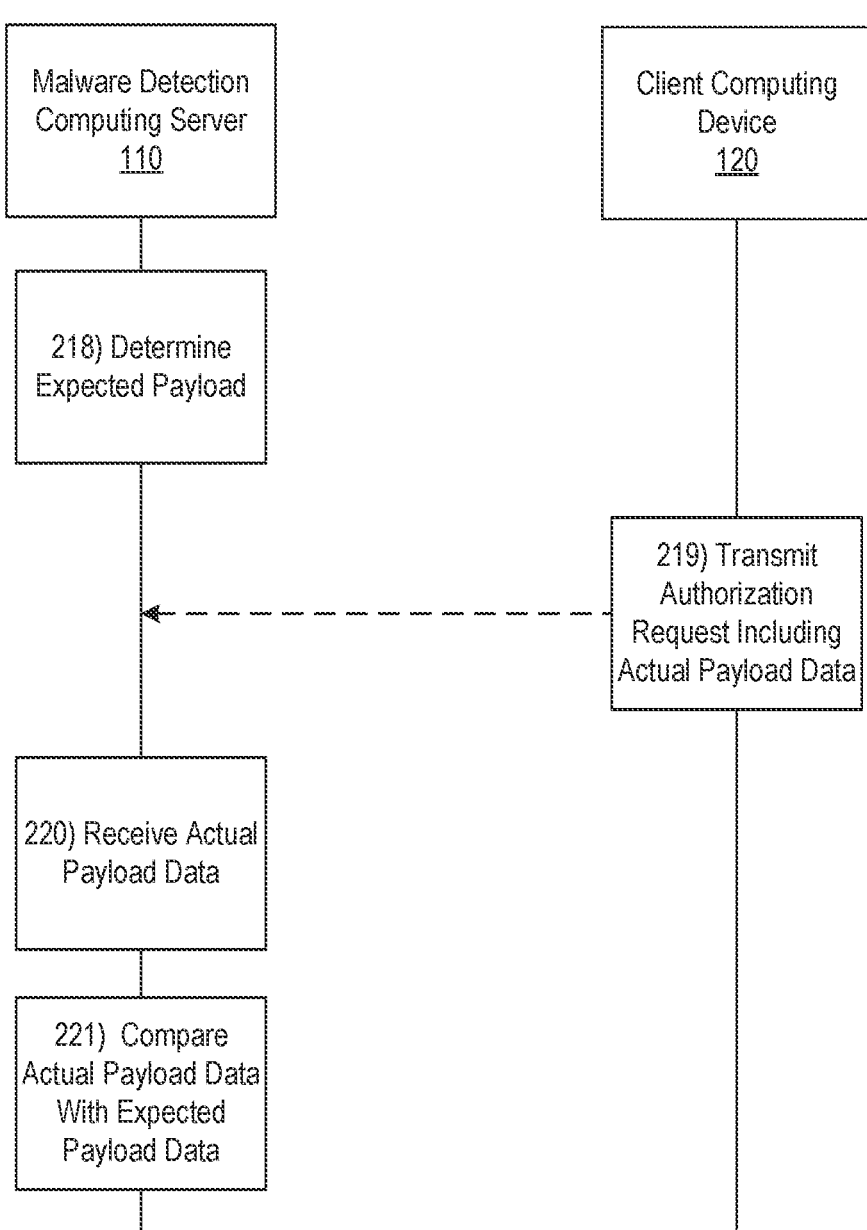

Referring to FIG. 2E, at step 218, based on running the simulation, the application server (e.g., malware detection computing platform 110) may determine an expected or simulated payload. For example, in determining the expected or simulated payload, the application server may determine, for each process or transaction, an execution time of the transaction, a data size of the transaction, types of data included in the transaction, and/or the like. At step 219, the client device (e.g., client computing device 120) may send an authorization request to the application server (e.g., malware detection computing platform 110). For example, the client device (e.g., client computing device 120) may send an authorization request to authorize a transaction. In addition, the request may include actual payload data associated with the transaction being executed at the client device. At step 220, the application server (e.g., malware detection computing platform 110) may receive, with the authorization request, the actual payload data for comparison with expected payload data. At step 221, the application server (e.g., malware detection computing platform 110) may compare the expected payload data with the actual payload data.

Figure 2F:
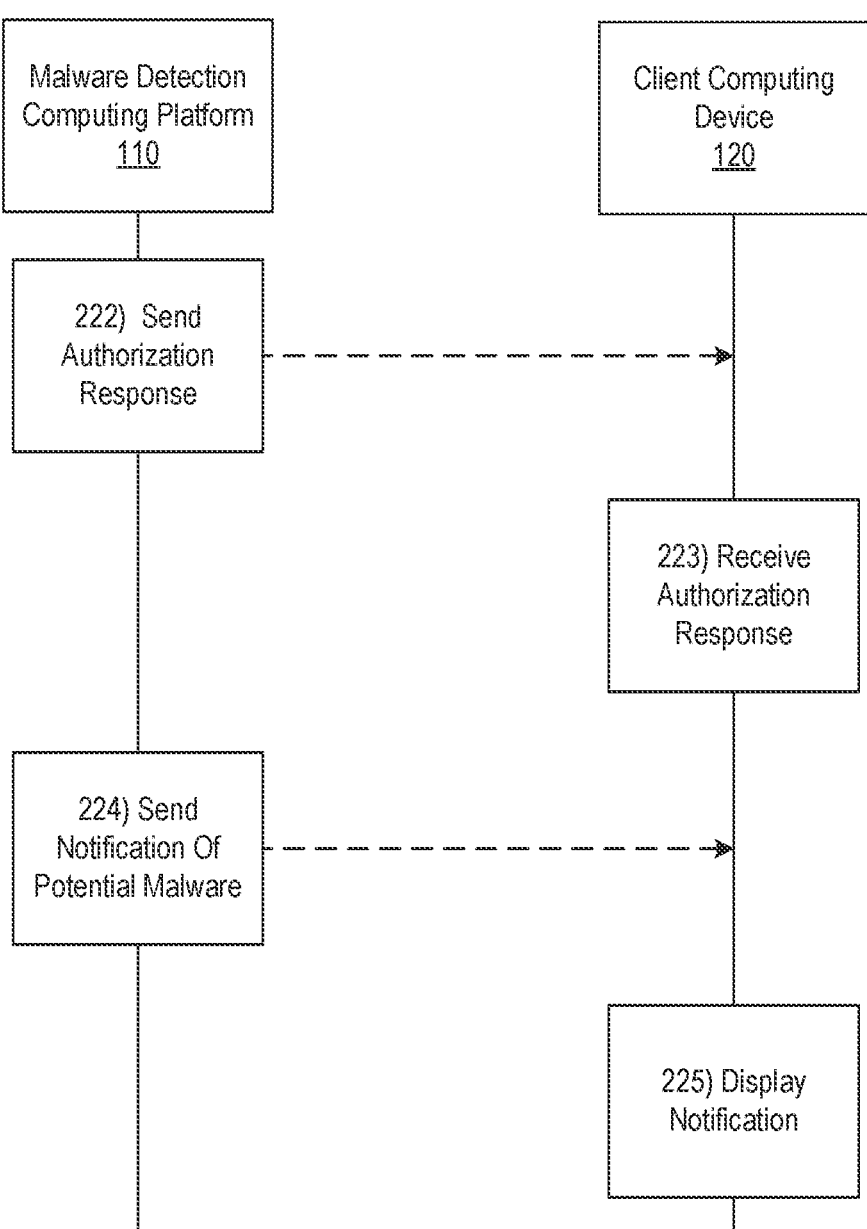

Referring to FIG. 2F, at step 222, based on the comparison, the application server (e.g., malware detection computing platform 110) may send an authorization response (e.g., message or notification) to the client device (e.g., client computing device 120). At step 223, the client device (e.g., client computing device 120) may receive the authorization response. In some examples, based on the expected payload data matching the actual payload data, the application server (e.g., malware detection computing platform 110) may determine that the client device (e.g., client computing device 120) is free of malware, and send a message to the client device (e.g., client computing device 120) indicating that the transaction is approved.

In other examples, based on the expected payload data not matching the actual payload data, the application server (e.g., malware detection computing platform 110) may send a message to the client device (e.g., client computing device 120) indicating that the transaction is denied or placed on hold.

In some examples, at step 224, based on the expected payload data not matching the actual payload data, the application server (e.g., malware detection computing platform 110) may send a notification to the client device (e.g., client computing device 120) indicating the presence of malware, third party intervention, potentially malicious script, or the like. This is because, in many instances, when a device is infected with malware, additional information is added to the payload being sent to the server, resulting in the expected payload data not matching the actual payload data.

Oftentimes, the presence of malware may cause the device to run slower than usual, and even simple tasks may take a longer time to execute.

In matching or comparing the payloads, the application server (e.g., malware detection computing platform 110) may take into account a relative match amount or a relative match percentage to quantify a degree to with the expected payload data and the actual payload data match. The relative match amount or relative match percentage may be compared to a match threshold to determine if the expected payload data sufficiently matches the actual payload data.

In some embodiments, in sending the authorization response, malware detection computing platform 110 may, at step 225, cause the client device (e.g., client computing device 120) to display and/or otherwise present one or more graphical user interfaces similar to graphical user interface 300, which is illustrated in FIG. 3. As seen in FIG. 3, graphical user interface 300 may include text and/or other information notifying the user of the client device (e.g., client computing device 120) of detected malware (e.g., by malware detection module 112a) and/or notifying the user of potential actions that may be taken. (e.g., □Warning: Malicious Software Detected. Your computer is infected with potential malware. For your safety, the transaction will now terminate. [Remove malware□] [Details/Report malware□] [Protect device from future malware□] [Ignore warning□] □). Additionally or alternatively, similar notifications may be sent to individuals or entities with an organization (e.g., cybersecurity team, administrators, or the like).

Figure 4:
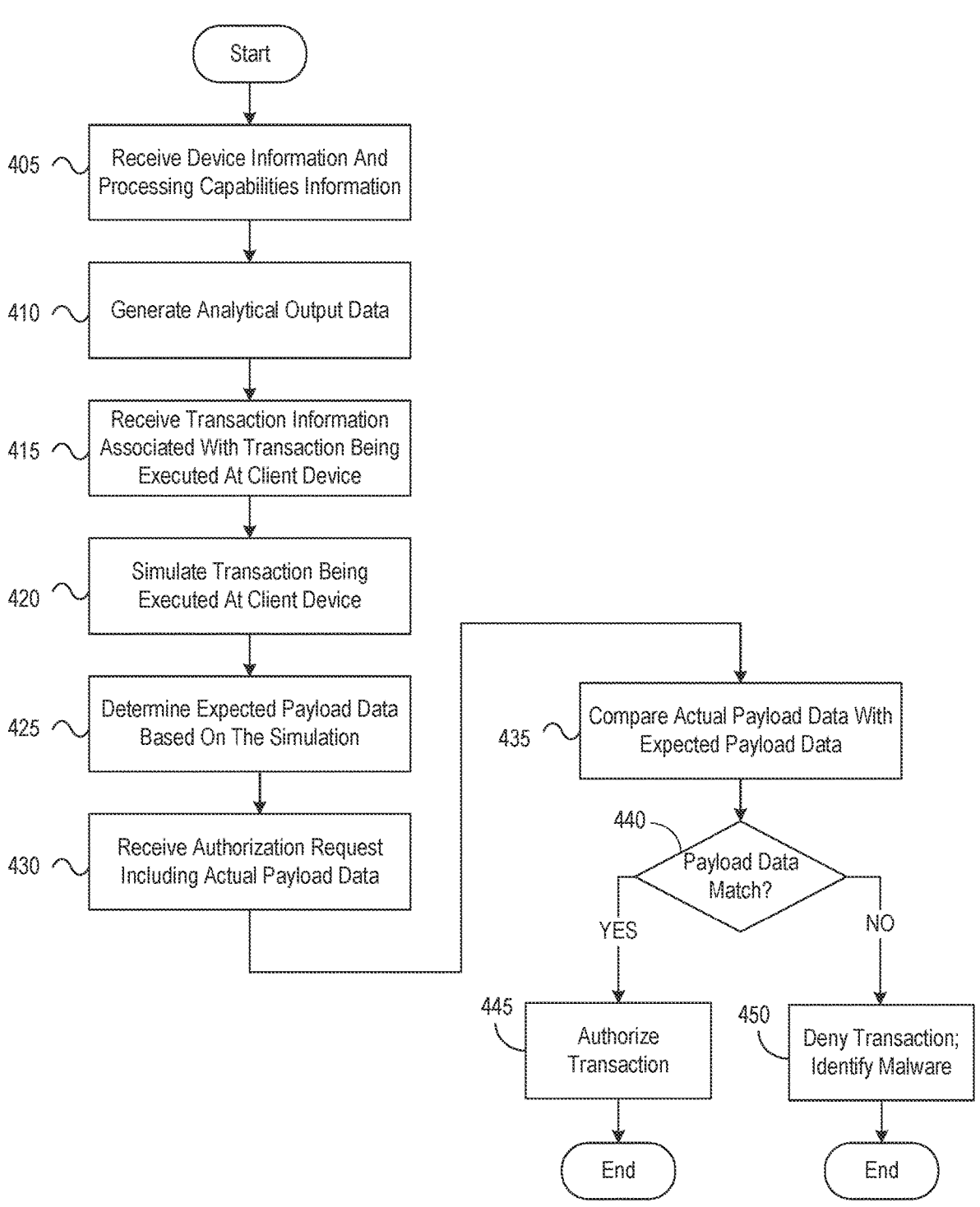
FIG. 4 depicts an illustrative method for detecting and preventing malware attacks using simulated analytics and continuous authentication in accordance with one or more example embodiments.

FIG. 4 depicts an illustrative method for detecting and preventing malware attacks using simulated analytics and continuous authentication in accordance with one or more example embodiments. Referring to FIG. 4, at step 405, an application server may receive, via an application interface, device information and processing capabilities information of a client device. At step 410, based on the device information and the processing capabilities information, the application server may generate analytical output data indicating, for each transaction executed on the client device, a transaction processing time. At step 415, the application server may receive transaction information associated with a transaction being executed at the client device. At step 420, based on the received transaction information and the analytical output data, the application server may simulate the transaction being executed at the client device. At step 425, the application server may determine expected payload data based on the simulation. At step 430, the application server may receive an authorization request, which may include actual payload data associated with the transaction being executed at the client device. At step 435, the application server may compare the expected payload data with the actual payload data. Based on the comparison, the application server may send an authorization response. In some examples, if it is determined in decision block 440, that the expected payload data matches the actual payload data, the application server may, at step 445, send an authorization response approving the transaction. If it is determined in decision block 440, that the expected payload data does not match the actual payload data, the application server may, at step 450, send a message denying the transaction and/or a notification indicating the presence of malware.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a client device;
an application server; and
an application interface located between the client device and the application server, wherein the application server is configured to:
receive, via the application interface, device information of the client device;
receive, via the application interface, processing capabilities information of the client device, wherein the processing capabilities information of the client device is determined by executing simulated processing of one or more types of transactions at the client device during an enrollment process;
based on the device information and the processing capabilities information, generate analytical output data indicating, for each transaction executed on the client device, a transaction processing time, and transmit the analytical output data for storage in one or more database tables;
receive transaction information associated with a transaction being executed at the client device;
based on the received transaction information and the analytical output data, simulate the transaction being executed at the client device using a virtual representation of the client device;
determine expected payload data based on the simulation, wherein the expected payload data comprises an execution time and a data size;
receive an authorization request, wherein the authorization request includes actual payload data associated with the transaction being executed at the client device, wherein the actual payload data comprises an execution time and a data size;
compare the expected payload data with the actual payload data to determine a relative match amount or a relative match percentage;
compare the relative match amount or the relative match percentage to a match threshold to determine when the expected payload data matches the actual payload data; and
based on the comparison, send an authorization response, wherein when the expected payload data does not match the actual payload data, the authorization response comprises a notification indicating presence of malware.

2. The system of claim 1, wherein the analytical output data comprises a graphical visualization representing results of a simulated process.

3. The system of claim 1, wherein simulating the transaction being executed at the client device comprising simulating transaction steps of the transaction based on the device information and the processing capabilities information of the client device.

4. The system of claim 1, wherein receiving the device information of the client device comprises receiving information related to one or more of: a device type, a vendor name, a model name or number, a firmware version, a product name, a device identifier, or a processor identifier.

5. The system of claim 1, wherein sending the authorization response comprises sending a message indicating whether the transaction is approved or denied.

6. The system of claim 1, wherein receiving transaction information associated with the transaction being executed at the client device comprises receiving information indicative of a transaction type.

7. The system of claim 1, wherein the transaction being executed at the client device comprises a transaction initiated on the client device via a mobile application.

8. A method comprising: at a computing platform comprising at least one processor, a communication interface, and memory:

receiving, by the at least one processor, via the communication interface, device information of a client device;

receiving, by the at least one processor, via the communication interface, processing capabilities information of the client device, wherein the processing capabilities information of the client device is determined by executing simulated processing of one or more types of transactions at the client device during an enrollment process;

based on the device information and the processing capabilities information, generating, by the at least one processor, analytical output data indicating, for each transaction executed on the client device, a transaction processing time, and transmitting the analytical output data for storage in one or more database tables;

receiving, by the at least one processor, transaction information associated with a transaction being executed at the client device using a virtual representation of the client device;

based on the received transaction information and the analytical output data, simulating, by the at least one processor, the transaction being executed at the client device;

determining, by the at least one processor, expected payload data based on the simulation, wherein the expected payload data comprises an execution time and a data size;

receiving, by the at least one processor, an authorization request, wherein the authorization request includes actual payload data associated with the transaction being executed at the client device, wherein the actual payload data comprises an execution time and a data size;

comparing, by the at least one processor, the expected payload data with the actual payload data to determine a relative match amount or a relative match percentage;

comparing the relative match amount or the relative match percentage to a match threshold to determine when the expected payload data matches the actual payload data; and based on the comparison, sending, by the at least one processor, an authorization response, wherein when the expected payload data does not match the actual payload data, the authorization response comprises a notification indicating presence of malware.

9. The method of claim 8, wherein the analytical output data comprises a graphical visualization representing results of a simulated process.

10. The method of claim 8, wherein simulating the transaction being executed at the client device comprising simulating transaction steps of the transaction based on the device information and the processing capabilities information of the client device.

11. The method of claim 8, wherein receiving the device information of the client device comprises receiving information related to one or more of: a device type, a vendor name, a model name or number, a firmware version, a product name, a device identifier, or a processor identifier.

12. The method of claim 8, wherein sending the authorization response comprises sending a message indicating whether the transaction is approved or denied.

13. The method of claim 8, wherein receiving transaction information associated with the transaction being executed at the client device comprises receiving information indicative of a transaction type.

14. One or more non-transitory computer-readable media storing instructions that, when executed by a computing platform comprising at least one processor, a communication interface, and memory, cause the computing platform to:

receive, via the communication interface, device information of a client device;

receive, via the communication interface, processing capabilities information of the client device, wherein the processing capabilities information of the client device is determined by executing simulated processing of one or more types of transactions at the client device during an enrollment process;

based on the device information and the processing capabilities information, generate analytical output data indicating, for each transaction executed on the client device, a transaction processing time, and transmit the analytical output data for storage in one or more database tables;

receive transaction information associated with a transaction being executed at the client device using a virtual representation of the client device;

based on the received transaction information and the analytical output data, simulate the transaction being executed at the client device;

determine expected payload data based on the simulation, wherein the expected payload data comprises an execution time and a data size;

receive an authorization request, wherein the authorization request includes actual payload data associated with the transaction being executed at the client device, wherein the actual payload data comprises an execution time and a data size;

compare the expected payload data with the actual payload data to determine a relative match amount or a relative match percentage;

compare the relative match amount or the relative match percentage to a match threshold to determine when the expected payload data matches the actual payload data; and based on the comparison, send an authorization response, wherein when the expected payload data does not match the actual payload data, the authorization response comprises a notification indicating presence of malware.

\* \* \* \* \*